May 5, 1970   D. R. CRAIG ET AL   3,510,305
PHOTOGRAPHIC UNSHARP MASKING METHOD INVOLVING
THE USE OF A PHOTOCHROMIC BODY
Original Filed Aug. 8, 1958

INVENTORS
JOHN N. STREET &
DWIN R. CRAIG

BY Raymond W Colter

ATTORNEY

United States Patent Office 3,510,305
Patented May 5, 1970

3,510,305
PHOTOGRAPHIC UNSHARP MASKING METHOD INVOLVING THE USE OF A PHOTOCHROMIC BODY
Dwin R. Craig, Falls Church, and John N. Street, Alexandria, Va., assignors to Logetronics, Inc., Alexandria, Va., a corporation of Delaware
Continuation of application Ser. No. 753,942, Aug. 8, 1958. This application Aug. 27, 1964, Ser. No. 392,379
Int. Cl. G03c 5/06
U.S. Cl. 96—44    20 Claims This application is a continuation of copending application Ser. No. 753,942, filed Aug. 8, 1958 and now abandoned.

The present invention relates to photographic methods and apparatus involving the use of photochromic bodies.

Photochromic bodies have been discussed at some length in the literature including articles by Hirshberg and Fischer appearing in Chemical Society Journal, 1954, pages 297 and 3129. As will appear from the first of these articles:

"Photochromism has been recorded for compounds related to dianthronylidene . . . and for two spiropyrans . . . " "The present paper describes results obtained with eight spiropyrans, namely, bisspiro-2:2'-(5:6-benzopyran) (I), 5:6-benzopyran-2-spiro-2'-B-naphthopyran (II) and its 3- and 3'-methyl derivative, 3:3'-dimethylbisspiro-2:2'-(B-naphthopyran) (III; R=Me) and the corresponding ester (III; R=$CO_2$Et) and 3:3'-trimethylene derivative (IV), and 1:3:3 - trimethylindoline-2-spiro-6'-(2':3'-B-naphthopyran) (V)." "All the compounds except (III; R=Me and $CO_2$Et) exhibit pronounced photochromism, i.e., when their solutions are irradiated with ultra-violet light at —115°, very intensely coloured dyes are developed."

In the second of these articles, eight additional photochromic compounds are identified and their characteristics are discussed. A more recent article appeared in "Electronic Design," Jan. 8, 1958 in connection with photochromic products produced by National Cash Register Company, Dayton, Ohio, wherein it appears that:

"The basic ingredient in the process is a special oil called metachromatic dye. Exposure to blue light causes the dye to turn a brilliant blue. When a yellow light shines on the exposed material, it becomes colorless. This chemical switch can be made indefinitely."

A photochromic material has its spectral absorption characteristics modified by exposure to light falling within a particular range of wavelengths. Some photochromic materials are reversible in that they can be returned to their original spectral transmission characteristics upon exposure to light falling within another range of wavelengths. Such photochromic bodies exhibit two distinct colors under these conditions respectively, and can be modified by the light frequencies to which they are responsive to assume either of the two phases.

One of the photochromic bodies fabricated by National Cash Register Company and examined in connection with the present invention was clear, transmitting all colors equally, until exposed to blue light, whereupon the body become a deep blue, the transition being a function of exposure to blue light which is expressed as the product of intensity and exposure time. Subsequently, this particular photochromic body was exposed to yellow light which caused it to return to its previously clear or colorless phase. These photochromic bodies are frequently encapsulated which will prevent diffusion between the individual cells upon exposure. Such encapsulation is not necessary, however, since the photochromic body may be used in the form of a liquid sealed in a container so as to form a thin film of any desired surface area. It is believed that this phenomenon of photochromism is a reversible chemical reaction resulting from molecular resonance to the ranges of wavelength employed. Different photochromic bodies respond to different wavelengths of light and the response in each case will vary somewhat with the ambient temperature.

The methods and apparatus contemplated by the present invention utilize the properties of said photochromic bodies for the photographic art, by directing light from a subject to modify a photochromic body, and forming a modified image of the subject with light directed through the body on a photosensitive surface. The modifying light and image forming light may be produced by a single source or multiple sources and may travel in the same direction towards the photochromic body or in opposite directions with respect thereto. The modification of the photochromic body and the forming of the image on the photosensitive surface may occur sequentially or simultaneously and the two types of light are preferably dissimilar in wavelength.

The photochromic body possesses an actinic light absorbing phase and an actinic light transmitting phase so that by the use of one of the types of light an image of a subject can be formed in the photochromic body whereupon actinic light can be passed through the photochromic body to produce a modified image of the subject on the photosensitive surface. The photochromic body preferably possesses an actinic light transmitting characteristic which varies as a function of exposure to light of prescribed wavelengths.

The photographic apparatus contemplated by the present invention comprises a photochromic body responsive to light of prescribed wavelengths to change its actinic light transmitting characteristics, the body lying in an opical path including a subject and a source of light within such wavelengths for producing an image of the subject in the body, and the body lying in an optical path between a source of actinic light and a photosensitive surface responsive thereto. The invention contemplates means for shifting the body axially and/or transversely of the actinic light path. It is also contemplated that a plurality of light sources of different wavelengths be employed for modifying the transmitting characteristics of the photochromic body.

The principles of this invention are eminently well suited as a substitute for known techniques of "dodging," "masking," and "burning-in" for reducing the apparent large scale density differences of photographic negatives to a range which can be accommodated by the emulsions on which the reproduction is to be produced. There have been previous proposals for automatically achieving these results in other ways as will be exemplified by the disclosures of U.S. Patent 2,842,025, dated July 8, 1958 and U.S. Pat. 2,988,978, dated June 20, 1961, both in the name of the present assignee.

A marked advantage of the present invention over such previous techniques results from the increased amount of light available for exposing the photosensitive surface, since once an image is formed in the photochromic body, it can be used as a filter or mask in conjunction with a light source of any desired intensity to produce a modified image on a photosensitive surface. Such an image is formed in the photochromic body without the need for development and immediately upon its exposure to light within the proper range of wavelengths. Moreover, wherever the photochromic body is reversible by exposure to light within another range of wavelengths, the previous image can be erased and the photochromic body reused indefinitely.

A more complete understanding of the invention will follow from a description of the accompanying drawings wherein.

Figure 1:
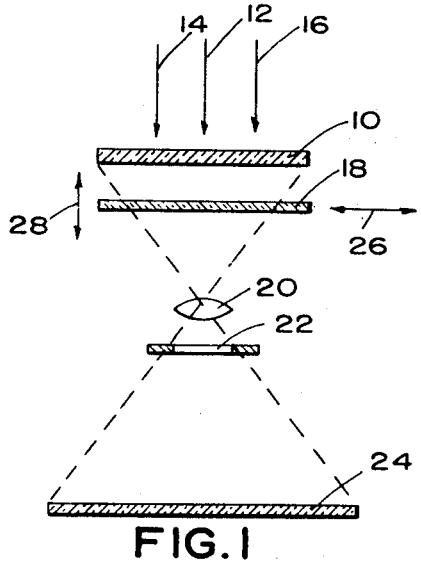
FIG. 1 is a diagrammatic illustration of one form of the invention.

An example of the use of photochromic bodies for automatic dodging has been depicted in FIG. 1 wherein the subject in the form of a transparency 10 receives light from one or more sources including actinic light 12, obscuring light 14 and clearing light 16. Below the transparency 10 as depicted in FIG. 1 is a photochromic body 18 disposed in the path of the three types of light described. The obscuring or image forming light 14 is within the range of wavelengths to which the photochromic body 18 responds to restrict the passage of actinic light 12. The clearing or erasing light 16 has a wavelength lying within a range which clarifies or erases images from the photochromic body so that it will transmit actinic light 12 uniformly. Accordingly, actinic light directed from the transparency through the photochromic body 18 will be projected by a lens 20 through an aperture 22 to a photosensitive surface 24 on which a modified image will be formed.

Figure 5:
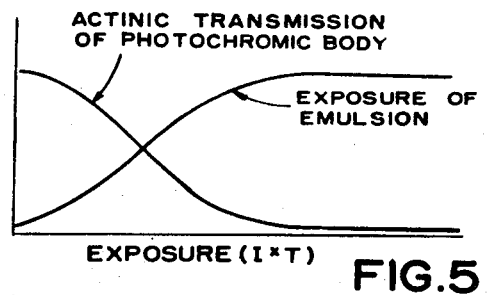
FIG. 5 depicts curves showing the change in actinic transmission of the photochromic body or dye and exposure of the emulsion as functions of exposure of the photochromic body (I.t)
Figure 6:
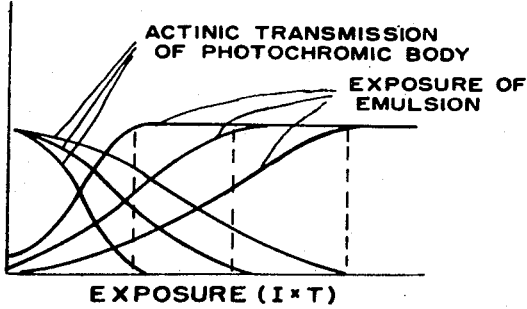
FIG. 6 is similar to FIG. 5 but pertains to three different regions of dissimilar exposure (I.t) rates.

It will follow that the photochromic body 18, in response to alternate exposure to obscuring light 14 and clearing light 16, will act as a gate for actinic light 12. As depicted in FIG. 5, the transmission of actinic light through the photochromic body decreases with exposure, the exposure of the photosensitive emulsion progressing until the photochromic body becomes completely opaque to actinic light. FIG. 6 depicts corresponding characteristics for three different regions within the transparency including a low density region which, at the beginning of the exposure, will transmit more light than the others, an intermediate density region in which the exposure rate is somewhat slower, and a high density region in which the exposure rate is even slower. Despite these differences in the rates of exposure, the three regions indicated by way of example can be made to yield the same final exposure level. This can be accomplished by choosing the relative exposure rates of the photochromic body and the photosensitive emulsion to correspond to the relative intensities of light in the object and image plane. The ratio between the actinic light and obscuring light intensities can be adjusted, filters can be interposed between these light components or the aperture 22 can be adjusted for the purpose. All of these techniques for controlling relative exposure rates will in effect control contrast of the image formed in the photochromic body. When the contrast of the image formed in the photochromic body is equal to the contrast of the transparency, the several regions of the resulting print will be of uniform density.

Figure 7:
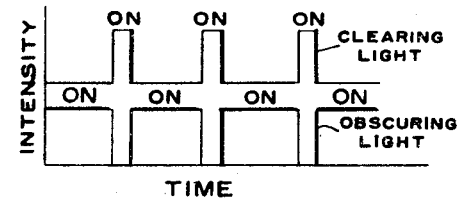
FIG. 7 depicts curves showing one manner in which the effective brightness ratio can be controlled by variation of duty cycles.

The ratio of brightness between the obscuring light 14 and the clearing light 16 can be adjusted so that the photochromic body can be made responsive to both the obscuring and clearing effects simultaneously, or the effective brightness ratio can be changed by controlling their respective duty cycles as has been illlustrated in FIG. 7.

If the distance between the transparency 10 and the photochromic body 18 is zero, sharpness of both images being identical, it will follow that no image at all will be perceptible in the image plane. However, by separating the transparency and photochromic body by a prescribed distance, an unsharp image can be produced in the photochromic body without affecting the sharpness of the image projected from the transparency, thereby producing a modification in the projected image of gross contrast only. As a matter of fact, when the photochromic body is contiguous to the lens, it serves as a light integrating shutter so as to find utility in a number of photographic applications.

Another way of producing an unsharp image in the photochromic body involves a variation in the position of the photochromic body transversely of the light path. Such motion in one direction only would produce an unsharp image composed of blurred lines. Motion in two horizontal dimensions such as a rotary motion will produce an image which is uniformly unsharp in all dimensions. Another way of producing an unsharp image involves the use of a photochromic body in the form of a thin liquid film wherein convection currents within the liquid produce diffusion of the image.

Means for producing movement of the photochromic body 18 is depicted in FIG. 1, the arrow 26 depicting means for achieving movement transversely of the light path and the arrow 28 depicting means for obtaining movement axially of the light path.

Figure 2:
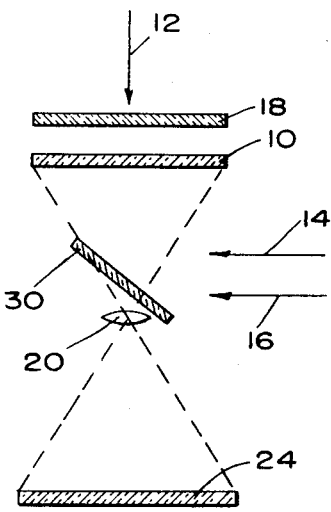
FIG. 2 is a diagrammatic illustration depicting another form.

In accordance with the form of the invention depicted in FIG. 1, the photochromic body including its container must be optically transparent, that is, capable of specular transmission rather than diffuse transmission. Under these conditions, the photochromic body can be interposed between the transparency and the projection lens without adversely affecting the optical quality of the projected image. In the form of the invention depicted in FIG. 2 however, the optical properties of the photochromic body including its container are not as critical. In this form of the invention, the subject in the form of a transparency 10 is interposed between the source of actinic light 12 and the projection lens 20. The obscuring light 14 and clearing light 16 are directed upon a beam splitter 30 from which they pass to the photochromic body 18 through the transparency 10 in a direction opposite to that of the actinic light. This form of the invention lends itself to the same techniques as discussed with reference to FIG. 1 for controlling contrast of the image formed in the photochromic body and its degree of unsharpness.

Figure 3:
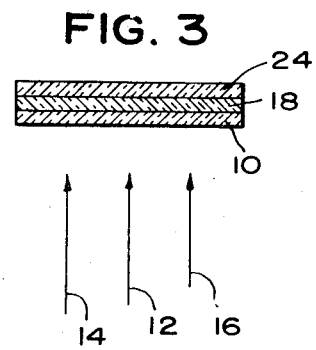
FIG. 3 is a diagrammatic illustration of a third form.

FIG. 3 illustrates an application of the invention to the production of contact prints. In this embodiment, the optical properties and the physical dimensions of the photochromic body become critical since the photochromic body must be sandwiched between a transparency 10 and a photosensitive surface 24 on which the image is to be reproduced. In such a case, the photochromic material may be encapsulated to provide minute individual cells in accordance with procedures already developed by National Cash Register Company as mentioned previously.

Figure 4:
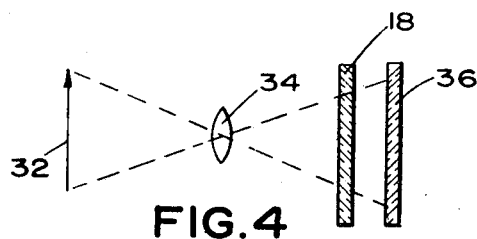
FIG. 4 is a diagrammatic showing of a fourth form of the invention.

The concept has been depicted in FIG. 4 as applied to a camera wherein a subject 32 directs light through a lens 34 and a photochromic body 18 upon a photosensitive film 36. In this case, the light from the subject 32 will provide the light components necessary for modifying the transmitting characteristics of the photochromic body 18 as well as the actinic light for exposing the film 36.

Inasmuch as the photochromic body can be made to respond in a matter of microseconds where the intensity of light to which it is exposed is adequate, other arrangements involving motion of the photochromic body, motion of the transparency and motion of the photosensitive emulsion can be employed. Suitable mixtures of photochromic bodies or dyes can be employed to produce spectral changes from a clear phase to neutral gray transmission, and modified by exposure to obscuring light and clearing light having wavelengths beyond the visible range, rendering the invention quite practical for many uses including the reproduction of color transparencies.

Figure 8:
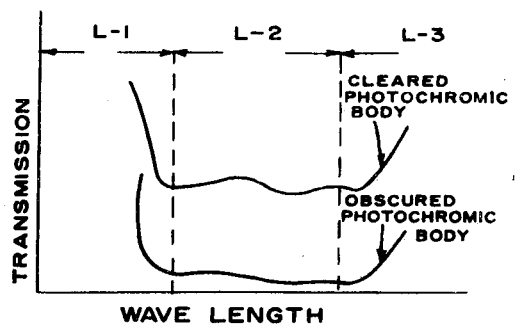
FIG. 8 depicts curves illustrating the wavelengths of light to which the photochromic body responds as lying beyond the range of actinic wavelengths to which the photosensitive surface responds.

As depicted in FIG. 8, the clearing light L–1 and the obscuring light L–3 have been depicted as lying outside of the range of the actinic light L–2. As depicted in these curves, the obscuring light and clearing light are bracketing the actinic wavelengths but they could both be at shorter or longer wavelengths than the actinic range. It is also required that the spectral transmission of the dye or photochromic body of other type in both the obscured and cleared phases be substantially neutral, possessing relatively equal transmitting characteristics throughout the actinic range.

Whereas the foregoing description has been confined to a relatively few embodiments of the present invention, they should not be construed as limiting beyond the scope of the appended claims.

We claim:

1. An unsharp masking method comprising directing light having a wavelength within a first range from a subject upon a photochromic body responsive to said light to receive and retain a first image of said subject substantially unaffected by light within a second range of wavelengths outside of said first range, and with said subject and first image in substantial registry, directing light within said second range of wavelengths from said subject and first image upon a surface to form a composite masked second image.

2. An unsharp masking method according to claim 1 wherein said light within said first and second ranges is directed from a single source.

3. An unsharp masking method according to claim 1 wherein said light within said first and second ranges is directed from separate sources respectively.

4. An unsharp masking method according to claim 1 wherein said light within said first and second ranges is directed towards said body in the same direction.

5. An unsharp masking method according to claim 1 wherein said light within said first and second ranges is directed towards said body in opposite directions respectively.

6. An unsharp masking method according to claim 1 wherein said image produced by light within said first range and said composite image are formed sequentially.

7. An unsharp masking method according to claim 1 wherein said image produced by light within said first range and said composite image are formed simultaneously.

8. An unsharp masking method according to claim 1 wherein said photochromic body is subsequently exposed to light having a wavelength within a third range outside of said first and second ranges to remove the image produced by light within said first range.

9. An unsharp masking method according to claim 1 wherein said body possesses an actinic light absorbing phase.

10. An unsharp masking method according to claim 1 wherein said second range of wavelengths includes actinic light.

11. An unsharp masking method according to claim 1 wherein said body possesses an actinic light transmitting phase.

12. An unsharp masking method according to claim 1 wherein said surface is defined by a photographic emulsion.

13. An unsharp masking method according to claim 1 wherein said light within said first range is directed from said subject by reflection.

14. An unsharp masking method according to claim 1 wherein said light within said first range is directed through said subject.

15. An unsharp masking method according to claim 1 wherein the image produced by said light within said first range is opposite to said subject in polarity.

16. Unsharp masking apparatus comprising a photochromic body lying in a first optical path between a subject and an image receiving surface, said body being responsive to light of wavelengths within a first range to receive and retain an image, being substantially unaffected by light of wavelengths within a second range outside of said first range, and being responsive to light of wavelengths within a third range outside of said first and second ranges to remove an image formed by light within said first range, said body lying in an optical path of light of said first, second and third ranges, said light within said second range traversing said first optical path to form a composite masked image on said receiving surface.

17. Unsharp masking apparatus according to claim 16 including means for shifting said body axially of the path of light of said second range.

18. Unsharp masking apparatus according to claim 16 including means for shifting said body transversely of the path of light of said second range.

19. Unsharp masking apparatus according to claim 16 wherein said light of said second range is actinic light.

20. Unsharp masking apparatus according to claim 16 wherein said image receiving surface is defined by a photographic emulsion.

References Cited

UNITED STATES PATENTS

| | | | |
|---|---|---|---|
| 1,808,743 | 6/1931 | Barkelew | 96—44 XR |
| 2,186,942 | 1/1940 | Vierling | 96—27 |
| 2,233,429 | 3/1941 | Ostromislensky | 96—89 XR |
| 2,596,677 | 5/1952 | Gosling et al. | 96—44 XR |
| 2,783,678 | 3/1957 | Andreas et al. | 96—27 XR |
| 2,953,454 | 9/1960 | Berman | 96—27 XR |
| 2,988,978 | 6/1961 | Craig | 96—44 XR |
| 3,105,761 | 10/1963 | Foris | 96—27 |

FOREIGN PATENTS 891,992  3/1962  Great Britain.

DAVID KLEIN, Primary Examiner